July 13, 1971 — B. D. MORGAN — 3,592,722

SLIDABLE ADHESIVE LAMINATE

Original Filed Aug. 16, 1967

*INVENTOR.*
BURTON D. MORGAN
BY
Oldham & Oldham
ATTORNEYS.

United States Patent Office 3,592,722
Patented July 13, 1971

---

3,592,722
SLIDABLE ADHESIVE LAMINATE
Burton D. Morgan, Hudson, Ohio, assignor to Morgan Adhesives Company, Stow, Ohio
Original application Aug. 16, 1967, Ser. No. 661,047. Divided and this application June 4, 1970, Ser. No. 43,481
Int. Cl. B32b 3/00, 7/14
U.S. Cl. 161—148                                    4 Claims

ABSTRACT OF THE DISCLOSURE

A slidable adhesive laminate composed of several distinct layers including a pressure sensitive adhesive layer, a layer of vinyl film or the like, a layer of release material covering the exposed surface of the adhesive layer, and a backing sheet for the layer of release material. There are two different release layers which consists of a first continuous layer covering the adhesive layer and a second discontinuous layer between the first layer and the backing sheet, removal of the backing sheets from the laminate causing removal of the second release material layer and the portion of the first release material layer not covered by the second discontinuous layer, the remaining portions of the first release material layer remaining in contact and projecting from the surface of the adhesive layer to hold the adhesive layer away from the receptive surface and permit sliding of the laminate along the surface until sufficient pressure is applied to the laminate.

---

This application is a division of copending application Ser. No. 661,047, filed Aug. 16, 1967.

This invention relates to a laminate that can slide on a special release surface layer or means formed therein, when the laminate's backing layer is removed but before a downwardly directed force is applied, thus allowing the correct positioning of the laminate before the adhesive is engaged with a support surface. As the backing layer is removed, only spaced portions of the release coating are removed to leave spaced dots of a release material on a pressure sensitive adhesive layer in the laminate exposed. It is this feature that allows the laminate to slide over any adhesive receptive surface before it is fastened securely to the surface. When force is exerted on the film laminate, the adhesive extrudes from below the dots of the release material and adheres to the receptive surface, or the dots of release material may be fractured to expose the adhesive, or the dots of release material sink into the pressure sensitive adhesive allowing the adhesive to come in close contact with the adhesive receptive surface.

For a better understanding of the laminate of the invention, reference should be had to the accompanying drawings which are fragmentary, vertical sectional views of the different phases of the construction, with the thickness of the layers being greatly exaggerated, of a preferred embodiment of the laminate of the invention.

Figure 1:
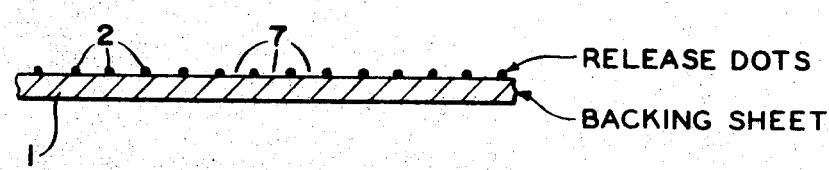
FIG. 1 is a cross-sectional view of the first step in producing the laminate and showing a special dotted release layer on a backing sheet.

Referring more specifically to FIG. 1, it shows the important first step in the process where release dots, composed of silicone or like conventional release chemicals are applied to the release paper or any other conventional backing sheet 1. These dots 2, for example, ideally having .005" as a diameter and .025" on centers, where the thickness of the coat is .0005", cover only part of the area of the release paper 1, leaving gap 7 between one dot and another and normally are applied to the backing sheet by a rotary press, which slightly embosses the backing sheet when and where the dots are applied thereto. The size and spacing and thickness of the dots will vary with different surface film sheets with the properties thereof. The dots can be relatively thick and closely adjacent for a film that drapes readily and the dots preferably are relatively thin and widely spaced for film that is not so flexible and doesn't drape readily. The release material may be dried or cured in a conventional manner. Or, the dotted release layer could be an ink which does not adhere tightly to the backing paper.

Figure 2:
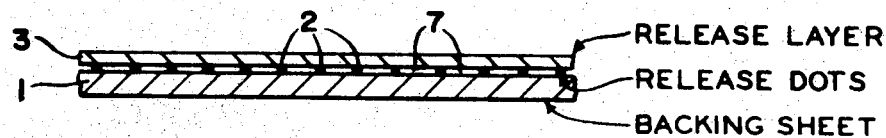
FIG. 2 is a cross-sectional view of the second step in producing the laminate by applying a continuous release coating.

At this point in the processing, a general release material 3, is applied as a coat or layer to cover the entire surface of the release paper 1 and dots thereon so that all the surface area is coated with the release chemical 3, as shown in FIG. 2. The layer 3 is preferably primarily made from a conventional release material, in this instance, Dow Chemical Company's Syloff 23, which is a silicone base release. In this example, about 75 parts by weight of such Syloff 23 were used mixed with about 25 parts by weight of nitro-cellulose. The layer 3 may, for example, be about .0005" thick and is dried or cured conventionally.

The third step of this process is applying a layer of any known pressure sensitive adhesive 4 to the exposed surface of the release layer 3 in the usual manner. The pressure sensitive adhesive used comprised, for example, 100 parts by weight of GRS 10100 and 70 parts of tackifier, plus about 2 parts of anti-oxident. The tackifier, Pentalyn H, is made by Hercules Chemical Co. and is a pentaerythritol ester of hydrogenated rosin. The final step in construction of this product is further seen in FIG. 3 where a layer of flexible, usually transparent plastic or elastomeric material, such as vinyl resin film or the like 5, is applied to the adhesive 4. After the completion of these last two steps by conventional means, the entire laminated units 6 is provided as shown in FIG. 3 and is ready for storage and/or use.

Figure 4:
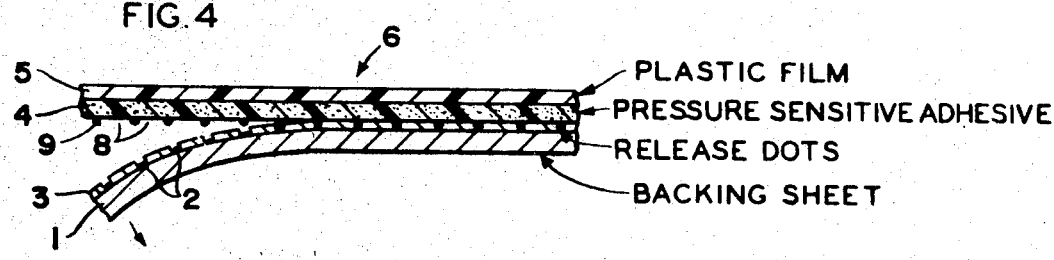
FIG. 4 is a cross-sectional view of the backing sheet being pulled away from the laminate to expose the special release means and adhesive layer provided in the laminate.

The first step in the use of this slidable adhesive laminate is shown in FIG. 4 with some of the release material being removed with the backing layer 1. As the paper layer 1 is peeled from the rest of the laminate 6, the continuous release coat or layer 3 is removed with the backing sheet as it has more affinity to it than to the adhesive. However, the release dots 2 that were first provided on the backing paper shown in FIG. 1, now prevent the adhesion of corresponding dots of the layer 3 to the sheet 1. Thus, there are gaps 8 between the dots 9 of the release material on the adhesive 4 where previously this arrangement of dots existed on the backing layer. Also, previously, there had been a continuous coating 3 of a release layer in contact with the adhesive, but now this coating has been pulled off the adhesive by the backing paper and only the dots 9 remain.

When it is desired to secure the plastic film 5 to a surface, the release dots 9 are placed in contact with an adhesive receptive surface and their non-adhesive qualities enable the film material to slide over the said surface to a desired location. Then as pressure is exerted in a downward direction, the adhesive 4 is extruded out to surround the release dots, or the dots are fractured so that the adhesive makes contact with the said surface now enabling the film to adhere to the surface. The film 5 is smoothly pressed against its support surface and due to the strong adhering qualities of the pressure sensitive adhesive 4, the film is firmly attached.

Figure 3:
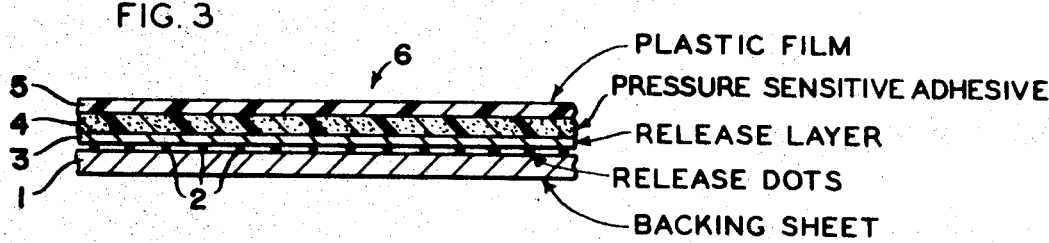
FIG. 3 is a cross-sectional view of the final laminate.

The release layers are shown in exaggerated separated form in FIG. 3 as the layers 1 and 3 will usually at least contact each other at some areas between the dots 2.

This invention provides a convenient means for directly applying an adhesive laminate on any adhesive receptive surface with the useful and desired characteristic of sliding over the surface until the preferred position is achieved. Then the laminate can readily be pressed into a fixed, adhered position.

While one complete embodiment of the invention has been disclosed herein, it will be appreciated that modification of this particular embodiment of the invention may be resorted to without departing from the scope of the invention as defined in the appended claims.

What is claimed is:
1. An adhesive laminate comprising
    a backing sheet,
    a first discontinuous layer of release material on one face of said backing sheet,
    a second continuous layer of release material covering said one face of said backing sheet and the first discontinuous layer thereon,
    a layer of pressure sensitive adhesive on said second continuous layer, and
    a plastic film layer secured to said pressure sensitive adhesive layer.
2. A laminate as in claim 1 where said second continuous layer is made from a silicone base material and nitro cellulose and discontinuous portions thereof remain on said adhesive layer when said backing sheet is removed.
3. A laminate as in claim 1 where said first discontinuous layer is formed from dots of release material.
4. A slidable adhesive laminate having a plastic film layer, a pressure sensitive adhesive layer on one surface of the film layer, a coating of release material covering the exposed surface of the adhesive layer, and a backing sheet for the coating of release material, the laminate being characterized in that the coating of release material consists of a first continuous layer covering the adhesive layer and a second discontinuous layer between the first layer and the backing sheet, removal of the backing sheet from the laminate causing removal of the second release material layer and the portion of the first release material layer not covered by the second discontinuous layer, the remaining portions of the first release material layer remaining in contact and projecting from the surface of the adhesive layer to hold the adhesive layer away from the receptive surface and permit sliding of the laminate along the surface until sufficient pressure is applied to the laminate to force the adhesive layer into contact with the receptive surface.

References Cited
UNITED STATES PATENTS

| | | | |
|---|---|---|---|
| 3,331,729 | 7/1967 | Danielson et al. | 161—406 |
| 3,413,168 | 11/1968 | Danielson et al. | 161—406 |
| 3,459,626 | 8/1969 | Morgan | 161—406 |

ROBERT F. BURNETT, Primary Examiner

J. J. BELL, Assistant Examiner

U.S. Cl. X.R.

117—45, 122P; 156—234; 161—167, 406

UNITED STATES PATENT OFFICE
CERTIFICATE OF CORRECTION

Patent No. 3,592,722　　　　　　　　　　Dated July 13, 1971

Inventor(s) Burton D. Morgan

It is certified that error appears in the above-identified patent and that said Letters Patent are hereby corrected as shown below:

Column 2, line 33, after "GRS", change "10100" to -- 1011 --.

Signed and sealed this 7th day of December 1971.

(SEAL)
Attest:

EDWARD M. FLETCHER, JR.　　　　　　ROBERT GOTTSCHALK
Attesting Officer　　　　　　　　　　Acting Commissioner of Patents